(12) United States Patent
Kim et al.

(10) Patent No.: US 10,401,623 B2
(45) Date of Patent: Sep. 3, 2019

(54) HOLOGRAPHIC REFLECTIVE SLIM VIRTUAL/AUGMENTED REALITY DISPLAY SYSTEM AND METHOD

(71) Applicant: NVIDIA Corporation, Santa Clara, CA (US)

(72) Inventors: Jonghyun Kim, San Jose, CA (US); Kaan Aksit, Mountain View, CA (US); Ward Lopes, Redwood City, CA (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/186,271

(22) Filed: Nov. 9, 2018

(65) Prior Publication Data

US 2019/0079287 A1    Mar. 14, 2019

Related U.S. Application Data

(63) Continuation of application No. 15/421,266, filed on Jan. 31, 2017, now Pat. No. 10,151,924.

(Continued)

(51) Int. Cl.

| | |
|---|---|
| *G02B 27/01* | (2006.01) |
| *G02B 5/32* | (2006.01) |
| *G02B 5/10* | (2006.01) |
| *G02B 27/14* | (2006.01) |
| *G02B 6/00* | (2006.01) |

(52) U.S. Cl.
CPC ........... *G02B 27/0103* (2013.01); *G02B 5/10* (2013.01); *G02B 5/32* (2013.01); *G02B 6/00* (2013.01); *G02B 27/0172* (2013.01); *G02B 27/141* (2013.01); *G02B 2027/013* (2013.01);
(Continued)

(58) Field of Classification Search
None
See application file for complete search history.

(56) References Cited

U.S. PATENT DOCUMENTS 10,151,924 B2 * 12/2018 Kim .................... G02B 6/00
10,241,328 B2 *  3/2019 Urey ................ G02B 27/0172

OTHER PUBLICATIONS

Yeom et al., "Reflection-type integral imaging system using a diffuser holographic optical element," Optics Express, vol. 22, Issue 24, pp. 1-10.

(Continued)

*Primary Examiner* — Jennifer D. Carruth
(74) *Attorney, Agent, or Firm* — Leydig, Voit & Mayer, Ltd.

(57) ABSTRACT

A display method and system are disclosed for virtual/augmented reality. The method includes the steps of generating an image by a projection engine and projecting light rays defining the image onto a diffuser holographic optical element (DHOE) located between an observer and a concave mirror element, where a concave surface of the concave mirror element faces the observer. The light rays are projected onto the DHOE at a reference angle that causes the light rays to be diffused to the concave surface of the concave mirror element and the diffused light rays are reflected back to the observer such that the observer perceives a virtual image that appears to the observer at a position behind the concave mirror element and further from the observer than the concave mirror element.

20 Claims, 14 Drawing Sheets

Related U.S. Application Data

(60) Provisional application No. 62/293,727, filed on Feb. 10, 2016.

(52) U.S. Cl.
CPC ............... *G02B 2027/0174* (2013.01); *G02B 2027/0178* (2013.01)

(56) References Cited

OTHER PUBLICATIONS

Maimone et al., "Pinlight displays: wide field of view augmented reality eyeglasses using defocused point light sources," ACM Transactions on Graphics, vol. 33, No. 4, Jul. 2014, pp. 1-11.

\* cited by examiner

HOLOGRAPHIC REFLECTIVE SLIM VIRTUAL/AUGMENTED REALITY DISPLAY SYSTEM AND METHOD

CLAIM OF PRIORITY

This application is a continuation of U.S. Non-Provisional application Ser. No. 15/421,266 titled "Holographic Reflective Slim Virtual/Augmented Reality Display System and Method," filed Jan. 31, 2017, claiming the benefit of U.S. Provisional Application No. 62/293,727 titled "Holographic Reflective Slim Virtual/Augmented Reality Display System and Method," filed Feb. 10, 2016, the entire contents of both applications is incorporated herein by reference.

FIELD OF THE INVENTION

The present invention relates to display systems, and more particularly to virtual/augmented reality display systems.

BACKGROUND

Augmented reality technology has improved, recently achieving higher resolution, increased computing power, larger eye-box size, and reduced latency. The importance of a large eye-box is recognized to provide a wide viewing window regardless of an observer's gaze position. Recently, a pinlight-based display system was developed to provide a large eye-box, but the pinlight display system suffers from low resolution, low transparency, and image degradation due to diffraction. There is a need for addressing these issues and/or other issues associated with the prior art.

SUMMARY

A method and system are disclosed for displaying virtual/augmented reality content. The method includes the steps of projecting light rays onto a diffuser holographic optical element (DHOE) located between an observer and a concave mirror element, where a concave surface of the concave mirror element faces the observer. The light rays are projected onto the DHOE at a reference angle that causes the light rays to be diffused to the concave surface of the concave mirror element and the diffused light rays are reflected back to the observer such that the observer perceives a virtual image that appears to the observer at a position behind the concave mirror element and further from the observer than the concave mirror element.

DETAILED DESCRIPTION

The present disclosure describes an augmented reality (AR) display system with high resolution, a sufficiently large eye-box so that gaze tracking is not needed, and high transparency for clear viewing of outside scenes and the projected image. The AR display system relies on a diffuser and a concave mirror. In one embodiment, the diffuser is a diffuser holographic optical element (DHOE). Light rays diffracted by the diffuser are reflected by the concave mirror, and the reflected light is goes through the diffuser without refraction and reaches an observer.

A DHOE, was first introduced in a frontal projection 3D display system described by Yeom et. al. in 2014 (J. Yeom, J. Jeong, C. Jang, K. Hong, S.-g. Park, and B. Lee, "Reflection-type integral imaging system using a diffuser holographic optical element," Opt. Express 22, 29617-29626). The DHOE is a holographic optical element that functions as a transmissive diffuser only for a reference wave, and functions as a transparent medium for other light waves. By taking advantage of the angular (and spectral) selectivity characteristics of DHOEs, a reflective-type AR display system can be achieved.

Figure 1A:
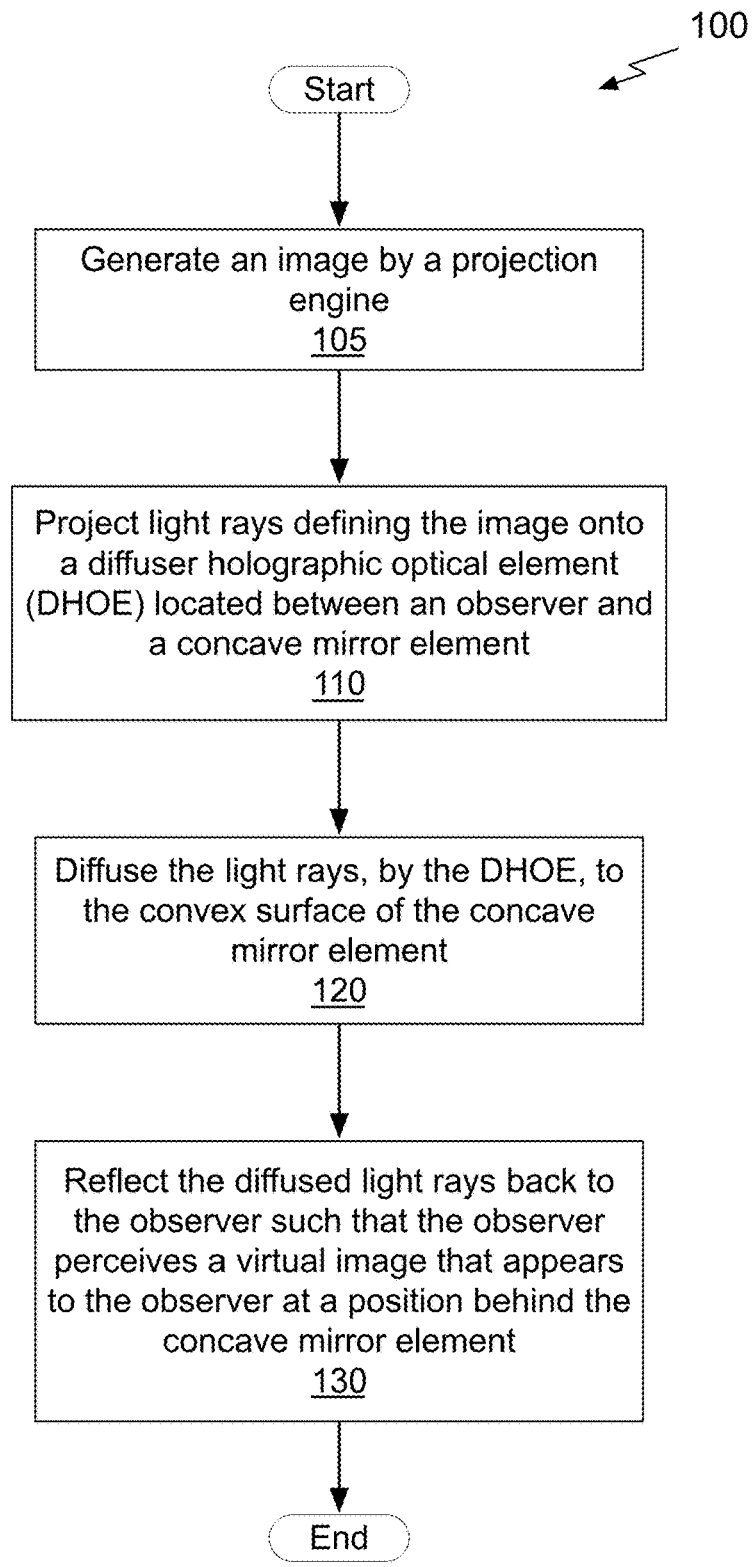
FIG. 1A illustrates a flowchart of a method for displaying virtual/augmented reality content, in accordance with one embodiment.

FIG. 1A illustrates a flowchart of a method 100 for displaying images by a virtual/augmented reality system, in accordance with one embodiment. Although method 100 is described in the context of a DHOE and a concave mirror element, the method 100 may also be performed using additional components, such as a light guide. Furthermore, persons of ordinary skill in the art will understand that any system that performs method 100 is within the scope and spirit of embodiments of the present invention.

At step 105, an image is generated by a projection engine. In one embodiment, the image is elemental images including a two-dimensional array of images of a scene or object that are each generated from a different viewpoint, so that when the images are viewed in combination, a three-dimensional virtual image of the scene or object appears. In another embodiment, the image is a complete image (i.e., a single image). At step 110, light rays defining the image are projected onto a diffuser holographic optical element (DHOE) located between an observer and a concave mirror element, where a concave surface of the concave mirror element faces the observer. In one embodiment, light rays defining an image are projected away from the observer and towards the DHOE and the concave surface of the concave mirror element. In another embodiment, light rays defining an image are projected towards the observer and the DHOE and away from the concave surface of the concave mirror element.

The light rays are projected onto the DHOE at a reference angle that causes the light rays to be diffused to the concave surface of the concave mirror element. At step 120, the DHOE diffuses the light rays to the concave surface of the concave mirror element. In one embodiment, the concave mirror element is a half-mirror. In one embodiment, the concave mirror element is a full mirror. In one embodiment, the concave mirror element is a wavelength selective half or full mirror.

At step 130, the diffused light rays are reflected back to the observer such that the observer perceives a virtual image that appears to the observer at a position behind the concave mirror element and further from the observer than the concave mirror element. More specifically, the diffused light rays output from the DHOE are reflected by the concave mirror element and travel back to the DHOE. However, due to the angular selectivity characteristics of the DHOE, the reflected light rays pass through the DHOE without any optical distortion, and reach the observer's eye. In one embodiment, the virtual image is a larger version of the image generated by the projection engine at step 105.

In one embodiment, an additional light guide is included between the observer and the DHOE to fold the optical path by internal reflection and ensure sufficient projection distance with reduced viewing distance and eye relief. Reduced eye relief is crucial to make a HMD with a smaller form factor and sufficient projection distance is needed to provide a sufficiently large virtual image.

In one embodiment, a wavelength-selective dichroic mirror can be used as the concave mirror element. The wavelength-selective dichroic mirror provides higher efficiency, transparency, and security by keeping light rays emitted by a projector within the virtual/augmented reality system, so that displayed information cannot be viewed from outside the virtual/augmented reality system. In one embodiment, a projector (such as laser projector) configured to generate the wavelength(s) selectively reflected by the wavelength-selective dichroic mirror is used to generate the light rays. The dichroic mirror selectively reflects only the specific wavelengths of light rays generated by the wavelength selective projector and does not reflect other wavelengths. Such a wavelength selective embodiment can shield wavelengths used by the projector from the virtual/augmented reality system while protecting the privacy of the observer's displayed information.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Figure 1B:
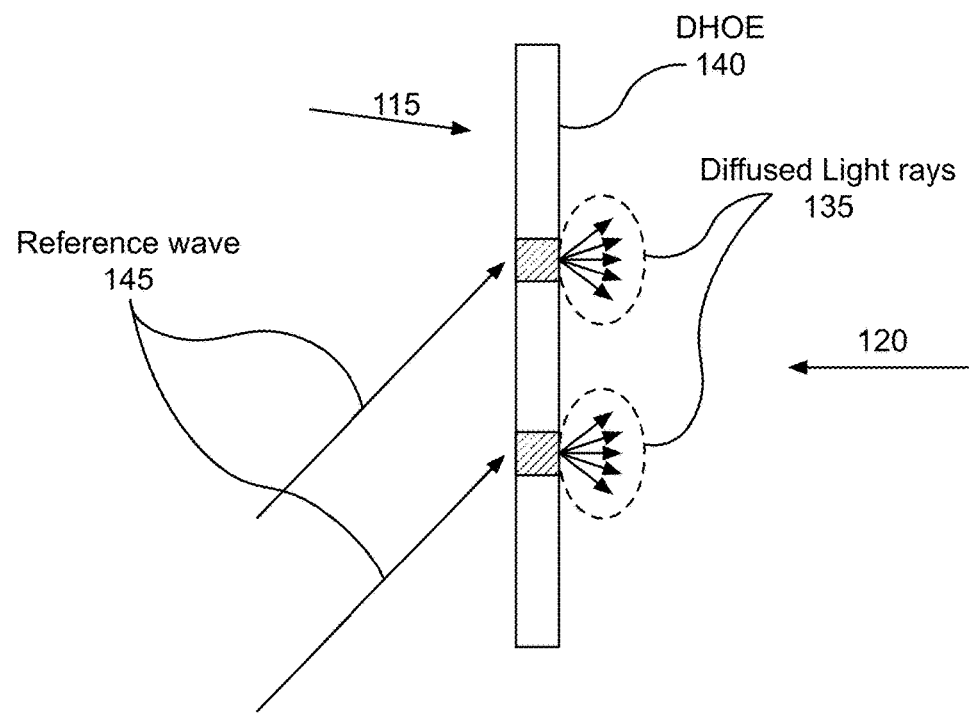
FIG. 1B illustrates a diffuser holographic optical element (DHOE), in accordance with the prior art.

FIG. 1B illustrates a DHOE 140, in accordance with the prior art. The DHOE 140 is a one-directional angular wavelength selective diffuser. The DHOE 140 is configured by recording a one-directional diffuser to a HOE using a reference wave 145 from a particular point or particular angle. The HOE then functions as a diffuser for light rays received from the particular point or particular angle. Therefore, when a projector is located at the exact point or a point near where the reference wave originated, then the light rays from the projector are diffused by the DHOE 140, and an observer at the opposing side of the DHOE 140 (on the right side facing the DHOE 140 in FIG. 1B) can see a clear image produced by the diffused light rays.

However, for light rays intersecting the DHOE 140 from other directions, such as light rays 115 and 125, the DHOE 140 functions as a transparent medium. The DHOE 140 does not affect light rays projected onto opposing side of the DHOE 140 or light rays intersecting the DHOE 140 from an angle that does not equal or is not close to the angle of the reference wave 145. The DHOE 140 is a special type of diffuser that utilizes angular selectivity and transparency characteristics. The characteristics originate from the holographic nature of the DHOE 140 and cannot be achieved with conventional optical elements such as lenses, mirrors, diffusers, or a combination of conventional optical elements. The light rays that diffract from the DHOE 140 satisfy the Bragg matching condition or are a close approximation to satisfying the Bragg condition. Operation of the DHOE 140 is based on a position of the projector or angle of the input light rays depends on the thickness of the holographic film used to create the DHOE. A thinner holographic film (such as 20 microns) will accept a larger range of input angles than a thicker holographic film (such as 100 microns). Similarly, operation of the DHOE 140 changes based on a depth of the index of refraction modulation of the holographic film.

Figure 1C:
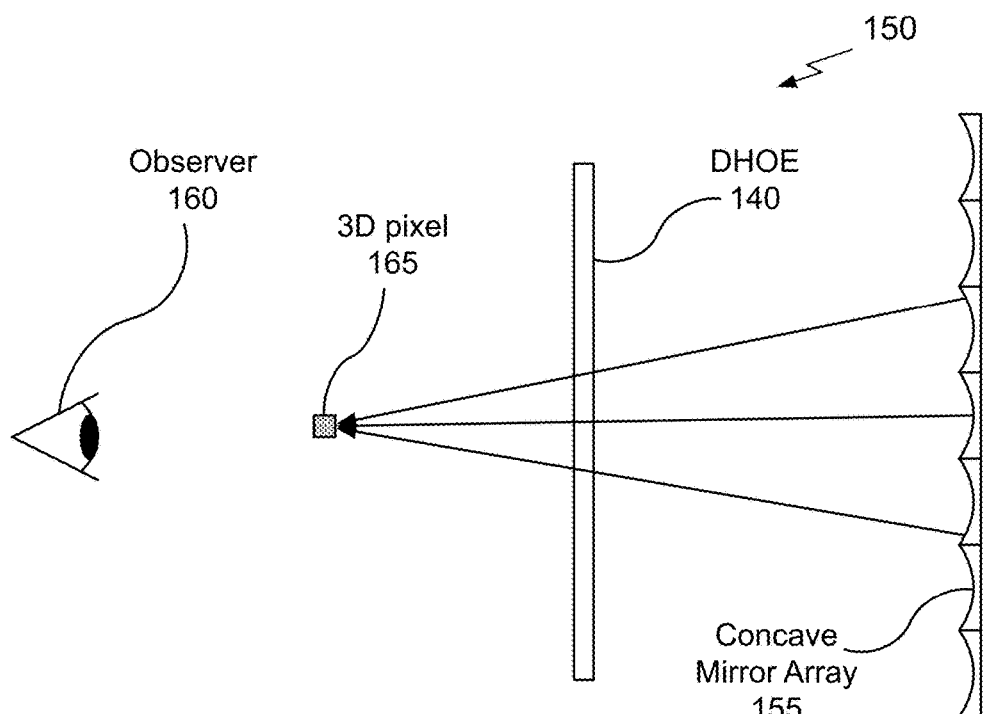
FIG. 1C illustrates a DHOE and concave mirror array, in accordance with the prior art

FIG. 1C illustrates a three-dimensional (3D) display system 150 including the DHOE 140 and a concave mirror array 155, in accordance with the prior art. Light rays define elemental images to produce a 3D pixel 165 and additional 3D pixels of a 3D image (not shown). The DHOE 140 diffuses the light rays intersecting the DHOE 140 from the angle of the reference wave 145 and the concave mirror array 155 reflects the diffused light rays to produce the 3D pixel 165 and the additional 3D pixels of the 3D image. Light rays reflected from two or more of the concave mirrors in the concave mirror array 155 are integrated to form each 3D pixel. Note that the 3D image, including the 3D pixel 165 appears to an observer 160 at a position in front of the DHOE 140 and in front of the concave mirror array 155. Importantly, the 3D display system 150 is configured for a desktop viewing regime and is not suitable for a head-mounted or near to eye display regime.

Figure 2A:
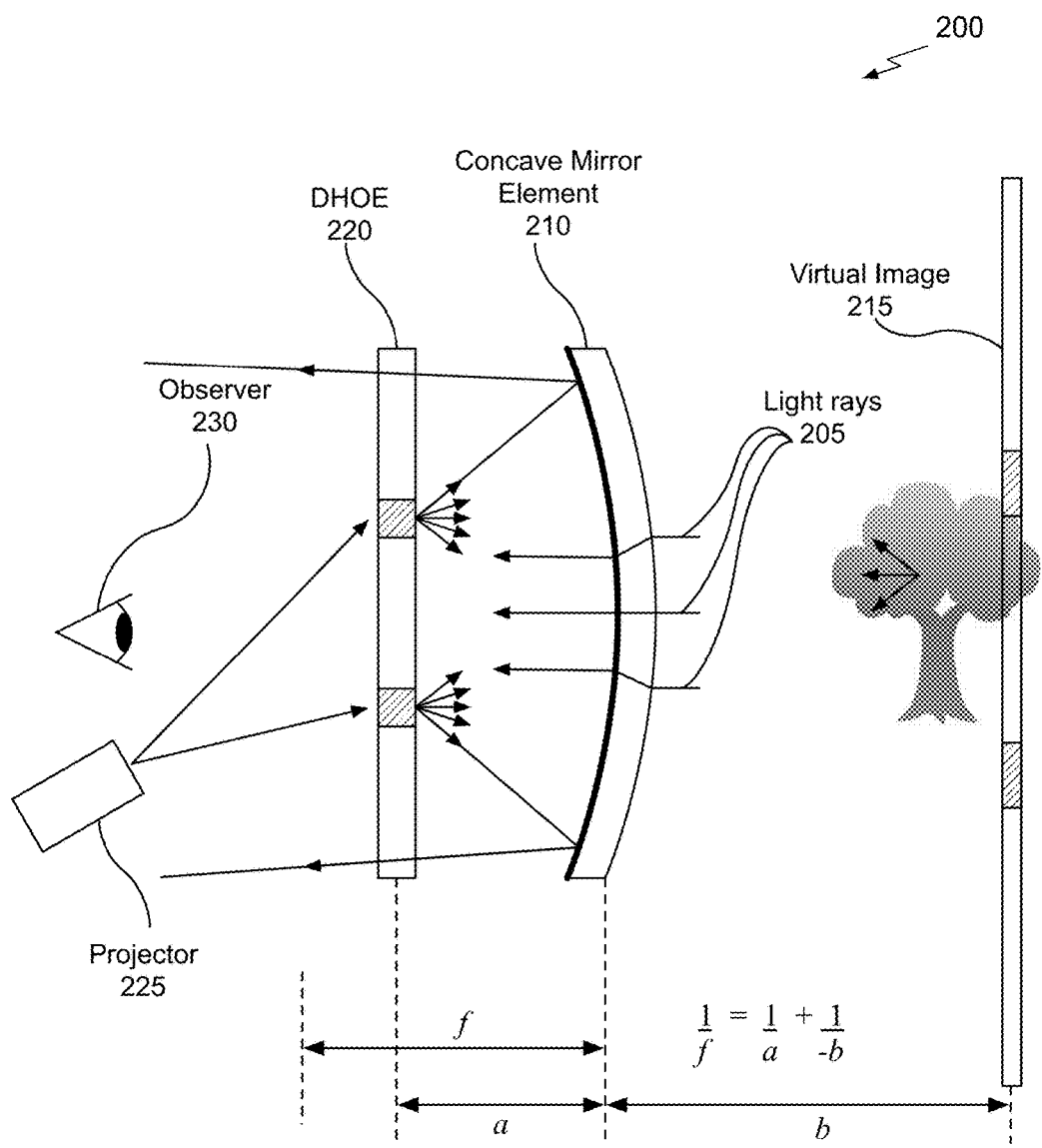
FIG. 2A illustrates a diagram of a virtual/augmented reality display system, in accordance with one embodiment.

FIG. 2A illustrates a diagram of a virtual/augmented reality display system 200, in accordance with one embodiment. In contrast with the 3D display system 150, a virtual image 215 appears to an observer 230 behind a DHOE 220 and behind a concave mirror element 210. The DHOE 220, was recorded with a diverging reference wave, and is located in front of the observer 230 and between the observer 230 and the concave mirror element 210. A projector 225 is located at the position where the reference wave light source was located (i.e., where the reference wave originated). The projector 225 generates divergent light rays defining an image and the image is diffused in the forward direction at the DHOE 220. In one embodiment, the projector 225 comprises multiple projection devices, where each projection device generates a portion of the image. In one embodiment, the divergent light rays generated by the projector 225 are redirected using one or more mirrors or other optical device(s) to reach the DHOE 220. The light is diffused through the DHOE 220 such that the DHOE 220 is illuminated with the image projected by the projector 225. The image is then reflected off the concave mirror element 210 and reflected back through the DHOE 220 to be directed at the observer 230.

The DHOE 220 is recorded with the reference wave light source diverging from a position of the projector 225 and the signal wave originating from a diffuser. Therefore, the DHOE 220 diffuses only the light rays originating from the projector 225. Light rays 205 propagating towards the DHOE 220 from behind or from directions that do not originate at the projector 225 pass through the DHOE 220 without being diffused (and without any optical distortion). The diffused light output by the DHOE 220 is reflected at the concave mirror element 210. In one embodiment, both sides of the concave mirror element 210 have the same radius of curvature and a surface of the concave mirror element 210 facing the DHOE 220 is coated so that the concave mirror element 210 is a concave half mirror.

The concave mirror element 210 forms a virtual image 210 at infinity when a distance a, between the concave mirror element 210 and the DHOE 220 is equal to a focal length f, of the concave mirror element 210. When the focal length f is longer than the distance a, the virtual/augmented reality display system 200 forms the virtual image 215 at a large virtual plane behind the concave mirror element 210 that is closer than infinity. In one embodiment, f is set to be slightly larger than a, so the image diffused from DHOE surface forms an enlarged virtual image 215 at a distance b beyond the concave mirror element 210. The distance b is decided by a simple lens equation: $1/f=1/a-1/b$.

The virtual/augmented reality display system 200 produces a sufficiently large eye-box without gaze tracking, thereby providing a clear image regardless of the observer's 230 gaze direction. Even with pupil movement, the observer 230 can see the virtual image 215 because the light rays are scattered from DHOE 220.

Figure 2B:
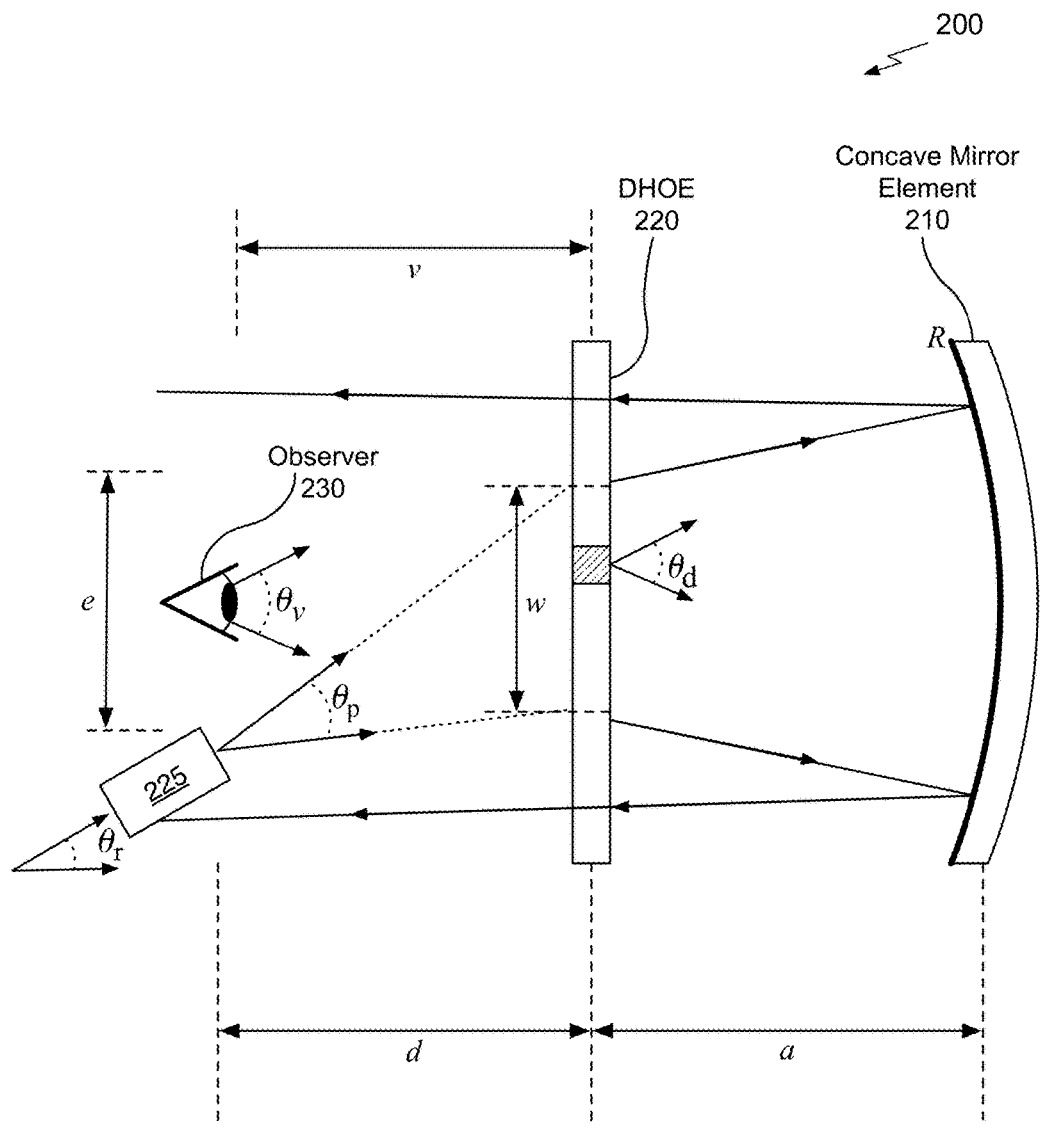
FIG. 2B illustrates an annotated diagram of the virtual/augmented reality display system shown in FIG. 2A, in accordance with one embodiment.

FIG. 2B illustrates an annotated diagram of the virtual/augmented reality display system 200, in accordance with one embodiment. The viewing characteristics of the virtual/augmented reality display system 200 may be analyzed with geometral optics for a viewing angle $\theta_v$ and eye-box size e. In other embodiments, the viewing characteristics may differ due to varying geometry and/or configurations of the components (e.g., concave mirror element 210, projector 225, and DHOE 220) as well as the inclusion of one or more additional components. As shown in FIG. 2B, v is the viewing distance or eye relief and R is the reflectance of the concave mirror element 210.

The width of the projected image on the DHOE 220, w can be derived from the projector 225 position and projection direction as follows:

$$w = d[\tan(\theta_r + \theta_p/2) - \tan(\theta_r - \theta_p/2)] \quad (1)$$

where d is a projection distance, $\theta_r$ is a reference wave angle, and $\theta_p$ is an output angle of the projector 225. The magnification m of the virtual image 215 that is enlarged by the concave mirror element 210 can be derived from Gauss's law as $m=|b/a|=f/(f-a)$, and a size I, of the virtual image 215 is derived as $I=mw=fw/(f-a)$. The viewing angle $\theta_v$ is determined from the virtual image size I and the distance between the image and the eye as follows:

$$\tan\left(\frac{\theta_v}{2}\right) = \frac{I/2}{v+a+b} = \frac{fd/2}{(f-a)(v+a+b)}\left[\tan\left(\theta_r + \frac{\theta_p}{2}\right) - \tan\left(\theta_r - \frac{\theta_p}{2}\right)\right] \quad (2)$$

The eye-box size e can be determined by the critical rays of diffracted light: the innermost ray from outermost image pixel on the DHOE 220. By assuming that the last pixel at the bottom border on the DHOE 220 plane is located on a first point (0, −w/2), the innermost ray from the first point travels to the surface of the concave mirror element 210 and is reflected at a second point (a, −w/2+a*tan($\theta_d$/2)), where $\theta_d$ is the angle through which rays are diffracted by the DHOE 220. The reflected critical ray travels back to the observer 230 and reaches to the border of the eye-box. The eye-box size e can be derived as follows:

$$\frac{e}{2} = (a+v)\tan\left(\frac{\left|a\tan\left(\frac{\theta_d}{2}\right) - \frac{w}{2}\right|}{f} + \frac{\theta_d}{2}\right) - \left|a\tan\left(\frac{\theta_d}{2}\right) - \frac{w}{2}\right| \quad (3)$$

Note that the eye pupil size and the gaze direction are not considered because the virtual/augmented reality display system 200 can provide the same quality image across any gaze angle within the eye-box e.

Figure 2C:
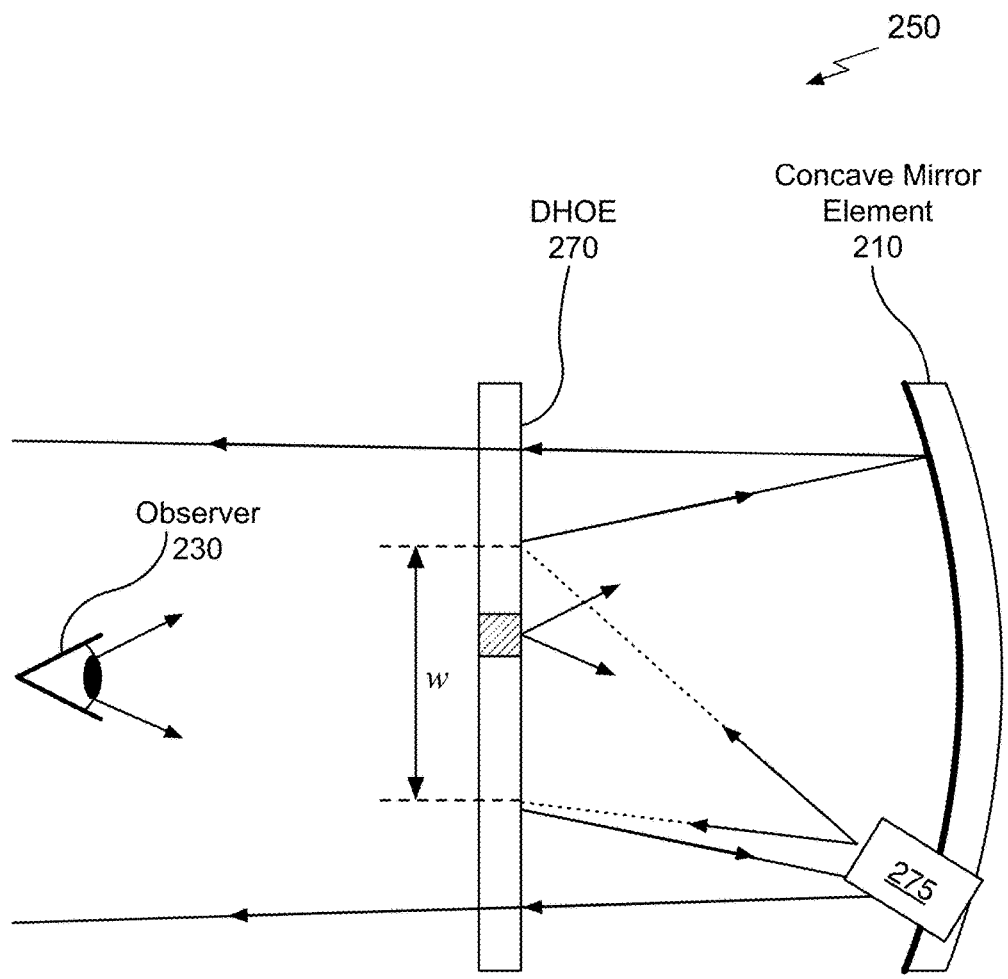
FIG. 2C illustrates another diagram of a virtual/augmented reality display system, in accordance with one embodiment.

FIG. 2C illustrates another diagram of a virtual/augmented reality display system 250, in accordance with one embodiment. Compared with the virtual/augmented reality display system 200, a projector 275 is located at a second position that is further from the observer 230 compared with a DHOE 270. In one embodiment, the projector 275 is located between the DHOE 270 and the concave mirror element 210. In contrast with the transmissive diffuser DHOE 220, the DHOE 270 is a reflective diffuser so that light rays are reflected and diffused at the surface of the DHOE 270. A virtual image appears to the observer 230 behind the DHOE 270 and behind the concave mirror element 210.

The DHOE 270, was recorded with a diverging reference wave and the projector 275 is located at the second position where the reference wave light source was located to record the DHOE 270 (i.e., where the reference wave originated). The projector 275 generates divergent light rays defining an image and the image is diffused in the reverse direction at the DHOE 270. The light is diffused at the DHOE 270 such that the back side (i.e., the side facing the concave mirror element 210) of the DHOE 270 is illuminated with the image projected by the projector 275. The image is then reflected off the concave mirror element 210 and reflected back through the DHOE 270 to be directed at the observer 230.

Figure 3A:
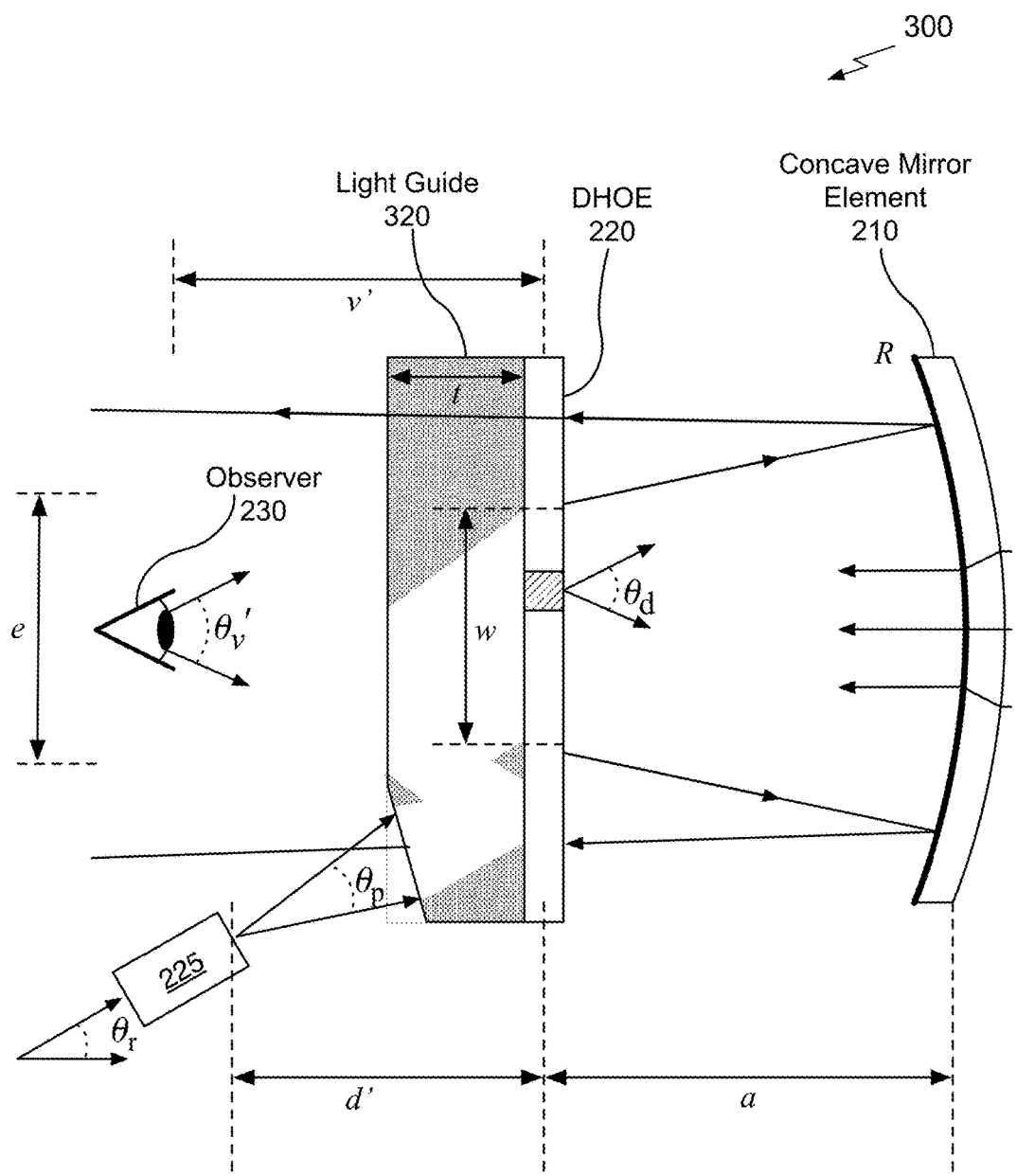
FIG. 3A illustrates a diagram of a virtual/augmented reality display system including a light guide, in accordance with one embodiment.

FIG. 3A illustrates a diagram of a virtual/augmented reality display system 300 including a light guide 320, in accordance with one embodiment. In one embodiment, the light guide 320 is a wave guide. The virtual/augmented reality display system 300 also includes the projector 225, the DHOE 220, and the concave mirror element 210 used in the virtual/augmented reality display system 200. In one embodiment, an index matched concave mirror replaces the concave mirror element 210 so that the concave mirror element 210 is at least partially transparent. In one embodiment, the overall transparency of the index matched concave mirror is greater than 90%.

As shown in FIG. 3A, the light guide 320 is a wedge shaped wave guide or a wedge prism. Alternatively, in one embodiment, the light guide 320 is based on free-form optics, such as a prism having one or more free-form surfaces. The virtual/augmented reality display system 300 requires sufficient projection distance to provide a large enough image to the DHOE 220. The light guide 320 is positioned between the observer 230 and the DHOE 220 and configured increase the projection distance by folding the optical path using internal reflection within the light guide 320. The folded light rays are diffused by the DHOE 220 and then reflected by the concave mirror element 210. The reflected light rays then pass through the DHOE 220 without being diffused and the light rays pass through the light guide 320 to reach the observer 230 without being reflected within the light guide 320.

Folding the optical path reduces eye relief, reduces a viewing distance v' and increases a viewing angle $\theta_d'$. In the context of the following description, eye relief is the distance between the eye and the first optical component in front of the eye. Reduced eye relief may be crucial to implement the virtual/augmented reality display system 300 in a head-mounted or wearable form factor. Furthermore, as shown in Equation (2), the viewing angle is closely related to the viewing distance v, and a larger viewing angle can be achieved with the wedge-shaped wave guide.

Figure 3B:
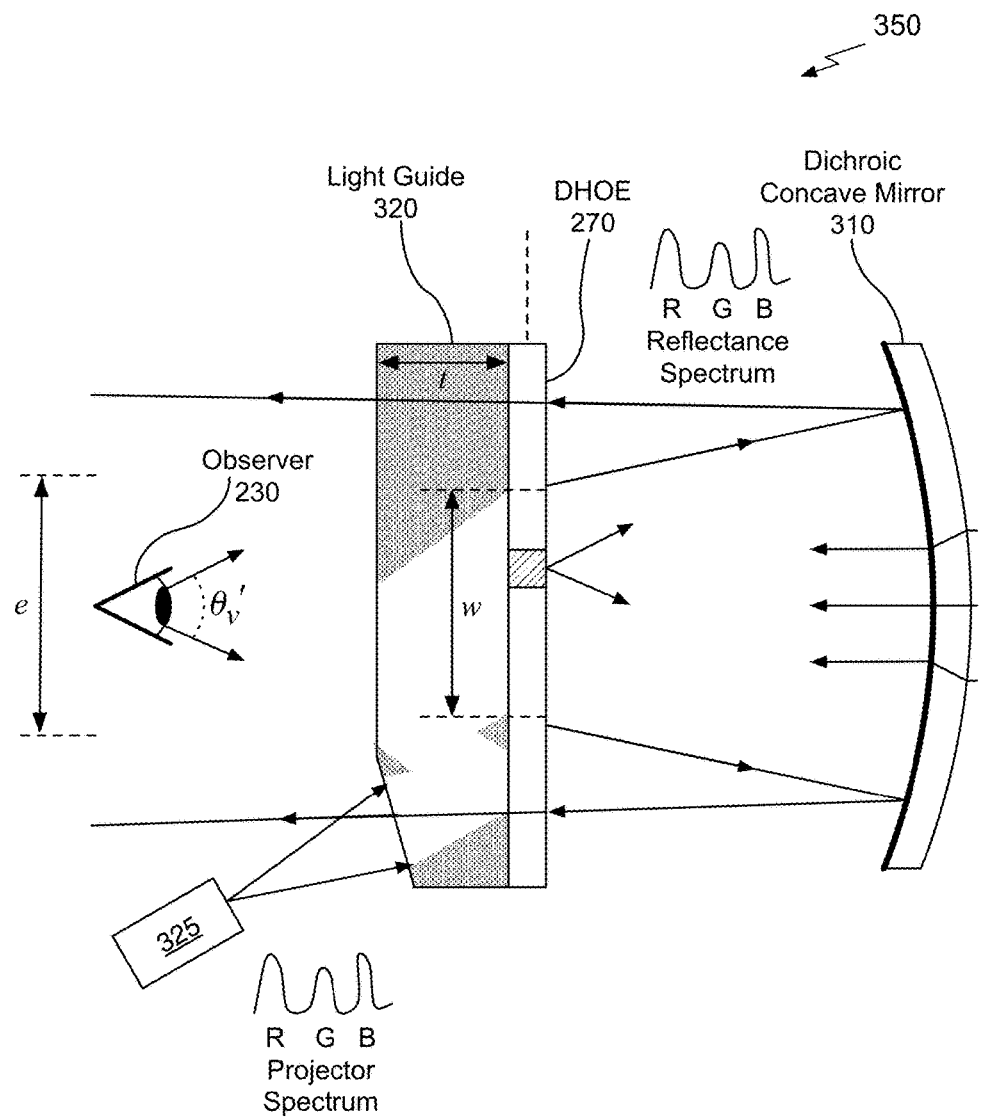
FIG. 3B illustrates a diagram of a virtual/augmented reality display system including a dichroic concave mirror, in accordance with one embodiment.

FIG. 3B illustrates a diagram of a virtual/augmented reality display system 350 including a dichroic concave mirror 310, in accordance with one embodiment. In one embodiment, the dichroic concave mirror 310 is a wavelength-selective dichroic concave mirror. As shown in FIG. 3B, the wavelengths may correspond to an RGB spectrum. The virtual/augmented reality display system 350 also includes the DHOE 220 and the light guide 320 used in the virtual/augmented reality display system 300. The projector 225 is replaced with a projector 325, such as a laser projector, that is configured to generate light rays having wavelengths that are reflected by the dichroic concave mirror 310.

In one embodiment, the projector 325 may include a white light source positioned behind one or more lenses, light modulating elements (e.g., liquid crystal panels), and color filter arrays. The projector 325 is configured to modulate a wavelength of light projected onto a surface of the light guide 320 by controlling the various elements enumerated above.

The dichroic concave mirror 310 is a wavelength-selective concave mirror that is coated on the concave surface, where the reflection wavelengths are matched with the wavelengths of the light rays generated by the projector 325. In other words, the wavelength-selective dichroic concave mirror 310 is paired with the projector 325. For example, the wavelength-selective dichroic concave mirror 310 may reflect light of wavelengths corresponding to a first color band, a second color band, and a third color band. The wavelength-selective dichroic concave mirror 310 may not reflect light of wavelengths that do not correspond to the first color band, the second color band, or the third color band. The projector 325 may then project light rays to form an image with light in each of the three color bands. In one embodiment, the three color bands are associated with red, green, and blue colors.

Relative to an embodiment that combines the concave mirror element 210 with a broadband beamsplitter coating, using the projector 325 and the wavelength-selective dichroic concave mirror 310 increases the reflectance R of the dichroic concave mirror 310, for those wavelengths reflected by the dichroic concave mirror 310, so that more light generated by the projector 325 is reflected from the DHOE 220 and the light generated by the projector 325 is prevented from exiting the virtual/augmented reality display system 350, hiding the displayed content from outside observers. A high transparency T of most of the transmitted wavelengths of light is maintained.

Figure 3C:
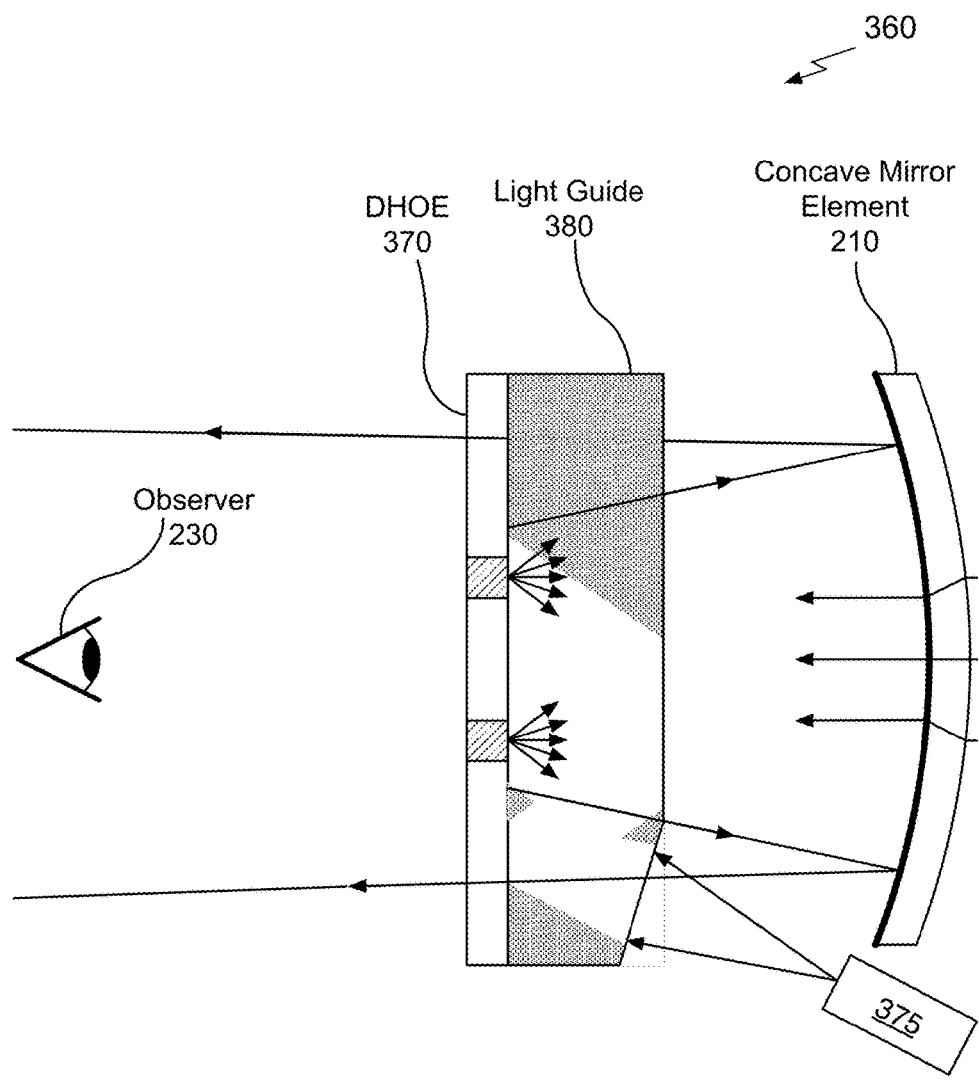
FIG. 3C illustrates a diagram of another virtual/augmented reality display system including a light guide, in accordance with one embodiment.

FIG. 3C illustrates a diagram of another virtual/augmented reality display system 360 including a light guide 380, in accordance with one embodiment. Compared with the virtual/augmented reality display system 300, a projector 375 is located at a second position that is further from the observer 230 compared with a DHOE 370. In one embodiment, the projector 375 is located between the DHOE 370 and the concave mirror element 210. The DHOE 370 is a reflective diffuser so that light rays are reflected and diffused at the surface of the DHOE 370. A virtual image appears to the observer 230 behind the DHOE 370 and behind the concave mirror element 210. As shown in FIG. 3C, the light guide 380 is a wedge shaped wave guide or a wedge prism. The virtual/augmented reality display system 360 requires sufficient projection distance to provide a large enough image to the DHOE 370. The light guide 380 is positioned between the projector 375 and the DHOE 220 and configured increase the projection distance by folding the optical path using internal reflection.

The DHOE 370 was recorded with a diverging reference wave and the projector 375 is located at the second position where the reference wave light source was located to record the DHOE 370 (i.e., where the reference wave originated). The projector 375 generates divergent light rays defining an image and the light rays are folded by the light guide 380 before the image is diffused in the reverse direction at the DHOE 370. The folded light rays are diffused at the DHOE 370 such that the back side (i.e., the side facing the concave mirror element 210) of the DHOE 370 is illuminated with the image projected by the projector 375. The image is then reflected off the concave mirror element 210 and reflected back through the DHOE 370 to be directed at the observer 230. In one embodiment, the projector 375 is replaced with the projector 325 and the concave mirror element 210 is replaced with the dichroic concave mirror 310.

Figure 4A:
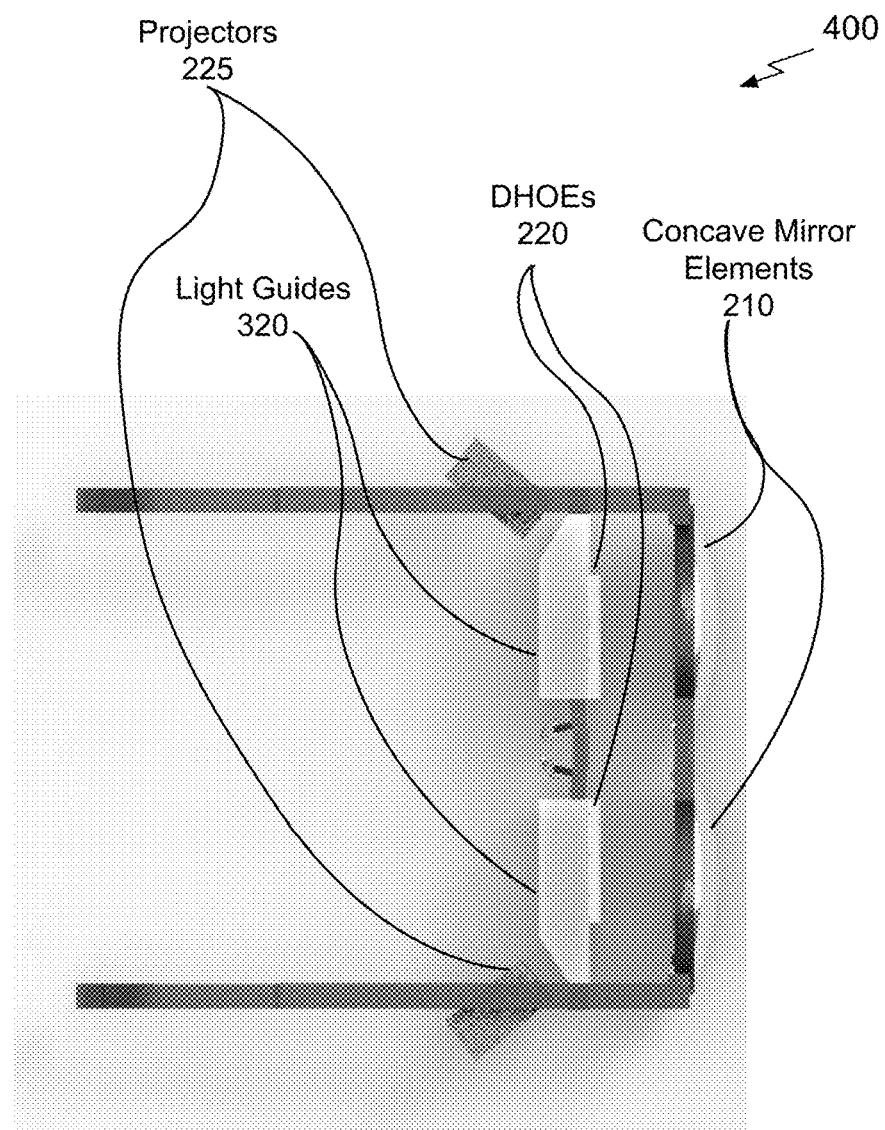
FIG. 4A illustrates a virtual/augmented reality head-mounted display system, in accordance with one embodiment.

FIG. 4A illustrates a virtual/augmented reality head-mounted display system 400, in accordance with one embodiment. The virtual/augmented reality head-mounted display system 400 is implemented in a glasses-type form factor and includes several components: two projectors 225, two light guides 320, two DHOEs 220, and two concave mirror elements 210. The two projectors 225 may be configured to project stereo images to produce a 3D image. An eyeglass frame apparatus supports the components and is configured to cover one or both eyes of the observer 230.

The light guides 320 reduce the space between the observer and the DHOE to be reduced for implementation in the glasses-type form factor. The virtual/augmented reality head-mounted display system 400 is a stereoscopic virtual/augmented reality head-mounted display system. In one embodiment, the projectors 225 and concave mirror elements 210 are replaced with the projectors 325 and concave mirror elements 310, respectively. In one embodiment, the virtual/augmented reality head-mounted display system 400 is implemented in monocle glasses-type form and only a single projector 225, light guide 320, DHOE 220, and concave mirror element 210 are included. In one embodiment, the DHOEs 220 are replaced with the DHOE 270 or 370, the light guides 320 are replaced with the light guides 380 and the projectors 225 are positioned between the light guides 380 and the concave mirror elements 210 to project light rays toward the DHOEs 270 or 370.

Figure 4B:
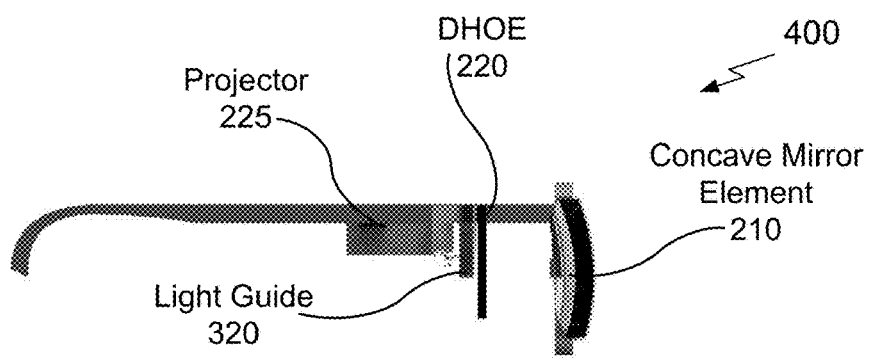
FIG. 4B illustrates another view of the virtual/augmented reality head-mounted display system shown in FIG. 4A, in accordance with one embodiment.

FIG. 4B illustrates another view of the virtual/augmented reality head-mounted display system 400 shown in FIG. 4A, in accordance with one embodiment. The virtual/augmented reality head-mounted display system 400 may be used as a virtual reality display when the two concave mirror elements 210 are complete mirrors so that all light from the environment (i.e., not generated by the projectors 225) is blocked.

Figure 4C:
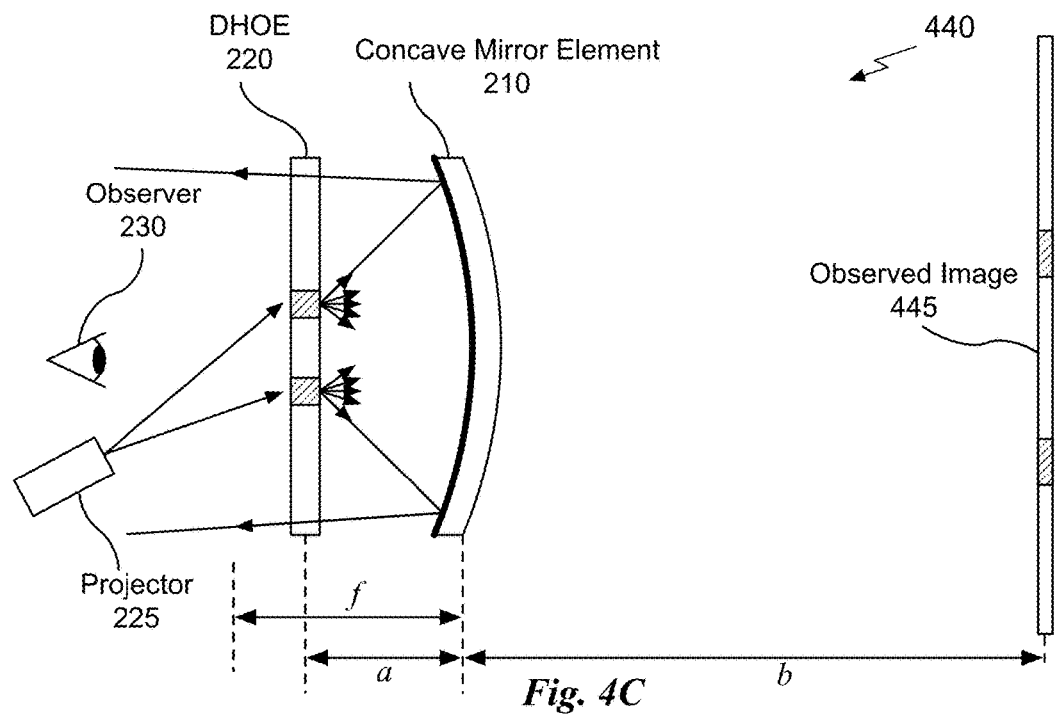
FIG. 4C illustrates an annotated diagram of the virtual/augmented reality display system, in accordance with one embodiment.

The virtual/augmented reality display systems 200, 300, 350 and the head-mounted display system 400 may be compared to conventional virtual reality (VR) systems. For example, a conventional VR system typically includes a liquid crystal display (LCD) or organic light emitting diode (OLED) display and a convex lens. Two important differences between the virtual/augmented reality display systems 200, 300, 350 and the head-mounted display system 400 and conventional VR systems are that a concave mirror is used rather than a convex lens and the image is displayed using a projector and diffuser instead of an LCD or OLED display. FIG. 4C illustrates an annotated diagram of a virtual/augmented reality display system 440, in accordance with one embodiment.

Figure 4D:
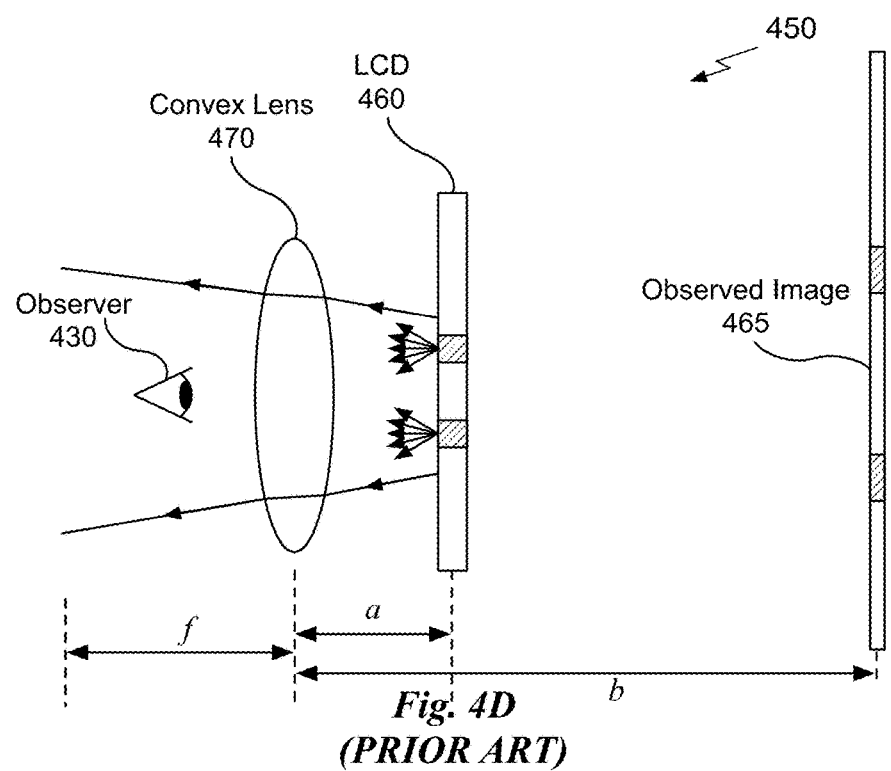
FIG. 4D illustrates an annotated diagram of a conventional liquid crystal virtual reality display system, in accordance with the prior art.

FIG. 4D illustrates an annotated diagram of a conventional LCD virtual reality display system 450, in accordance with the prior art. The conventional virtual reality display system 450 includes an LCD 460 and a convex lens 470. In contrast, the virtual/augmented reality display system 440 includes the projector 225, DHOE 220, and the concave mirror element 210.

As shown in FIGS. 4C and 4D, the optical elements of both the conventional LCD virtual reality display system 450 and the optical elements of the virtual/augmented reality display systems 200, 300, 350 and the head-mounted display system 400 may be configured in a similar topology. The focal length f of the concave mirror element 210 equals the focal length of a convex lens 470. The distance a between the DHOE 220 and the concave minor element 210 equals the distance between the convex lens 470 and the LCD 460. As a result, an observed image 445 generated by the virtual/augmented reality display system 440 is similar in size and resolution as an observed image 465 generated by the conventional LCD virtual reality display system 450. The distance b between the concave mirror element 210 and the observed image 445 equals a distance between the convex lens 470 and the observed image 465.

Additional differences between the virtual/augmented reality display system 440 and the conventional LCD VR system 450 are mass, center of mass, aberration, and curvature characteristics. The LCD 460 and convex lens 470 are typically heavier than the projector 225, DHOE 220, and the convex minor element 210. Furthermore, the LCD 460 is the heaviest component in the conventional LCD VR system 450 so that most of the mass is distributed in further from the observer 430. In the virtual/augmented reality display system 440, the mass is distributed closer to the observer 230 so the virtual/augmented reality display system 440 may be easier and more comfortable to wear (i.e., as an HMD without a strap around the back of the head). When the projector 225 is the heaviest component in the virtual/augmented reality display system 440, the weight is distributed closer to the observer 230, reducing the torque so that a glasses-type form factor may be used to implement the virtual/augmented reality display system 440.

Additionally, lenses are prone to image degradation due to chromatic aberration and distortions whereas mirrors do not cause image degradation due to chromatic aberration and distortions. Mirrors are also more light efficient compared conventional lenses and/or prisms because refraction causes some light loss (e.g., fresnel losses), and light loss increases with optical path length (i.e., bulk absorption). Fresnel losses, $R_f=(n-1)^2/(n+1)^2$, where n is the ratio of two mediums where refraction occurs, $n=n_2/n_1$. $R_f$ is typically 4-5% for Poly(methyl methacrylate) PMMA material and $R_f$ is slightly lower for Optical Glass (e.g., BK7). Bulk absorption, $T_b=T_0*exp(-d/\lambda)$, where $\lambda$ is the wavelength of the light, d is the thickness of the material, and $T_0$ is the optical transparency of the material at the wavelength $\lambda$. In contrast, mirrors can be made that are 99.99999% efficient. Therefore, the concave mirror element 210 provides a superior image in terms of quality compared with the convex lens 470. Finally, given the same curvature, R, the focal length f, for the concave mirror element 210 is approximately half that of the convex lens 470. Therefore, to achieve same optical power a much thicker concave lens 470 is needed, which can cause additional spherical aberration.

Figure 4E:
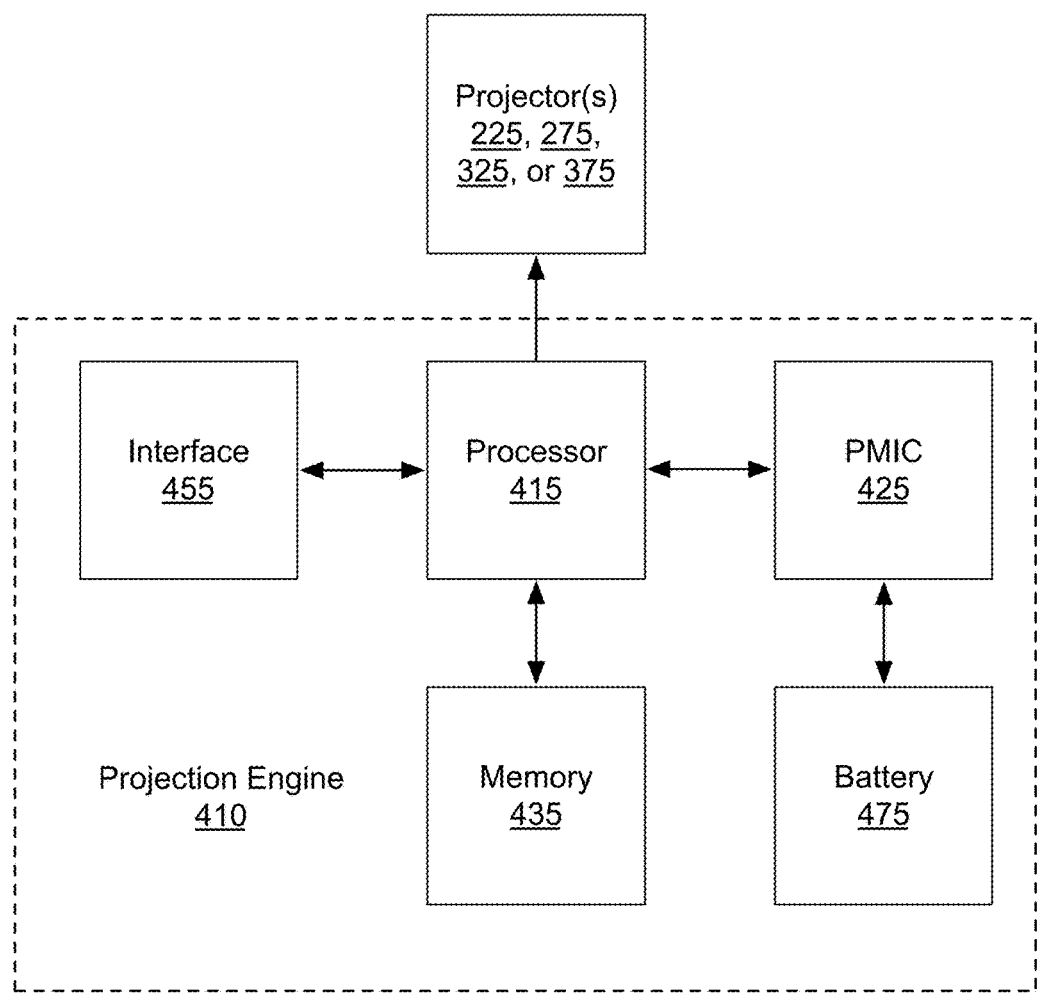
FIG. 4E illustrates a projection engine, in accordance with one embodiment.

FIG. 4E illustrates a projection engine 410, in accordance with one embodiment. The projection engine 410 that may be included within the projector 225, 275, 325, or 375 or, as shown in FIG. 4E, coupled to the projector(s) 225, 275, 325, or 375. The projection engine 410 includes electronics for generating images and the projector 225, 275, 325, or 375 modulates a light source (included in the projector) to project the images to the DHOE 220, 270, or 370 or the light guide 320 or 380. In one embodiment, the projector 225, 275, 325, or 375 comprises multiple projection devices, where each projection device generates a portion of an image. In one embodiment, the divergent light rays generated by the projector 225, 275, 325, or 375 are redirected using one or more mirrors or other optical device(s) to reach the 220, 270, or 370 or the light guide 320 or 380. In one embodiment, the projection engine 410 includes a processor 415, a memory 435, an interface 455, a power management integrated circuit (PMIC) 425, and a battery 475. The processor 415 and memory 435 may be implemented in a single package configuration (e.g., package-on-package (POP)) and affixed via solder to a printed circuit board (PCB) that includes the interface 455 and PMIC 425 affixed thereto. The battery 475 may be a lithium ion battery, which may be recharged using the PMIC 425 when the virtual/augmented reality head-mounted display system 400 is connected to an external power source. Alternatively, the battery 475 may be a disposable coin-type battery that can be replaced when the battery 475 is drained of charge.

In one embodiment, the interface 455 comprises a controller that implements a wireless communications standard such as IEEE 802.15 (i.e., Bluetooth) or IEEE 802.11 (i.e., Wi-Fi). The controller may include one or more transceivers and an antenna array consisting of one or more antennas for transmitting or receiving data via wireless channels. The controller may also include an on-chip memory for storing data received from the processor 415 for transmission over the wireless channels or data to be transmitted to the processor 415 received over the wireless channels. In another embodiment, the interface 455 comprises a controller that implements a wired communications standard such as a USB interface. The interface 455 may include a physical interface for plugging a cable into the virtual/augmented reality head-mounted display system 400 as well as a controller for managing communications over the communications channel(s).

In one embodiment, the processor 415 receives image data to be displayed on the virtual/augmented reality head-mounted display system 400 via the channels connected to the interface 455. The image data may be stored in the memory 435. The processor 415 may also implement algorithms for modifying the image data in the memory 435. For example, the processor 415 may warp the image data based on parameters stored in the memory 435 that map the image data to an observer's retina based on characteristics of the observer's eye. For example, the parameters may enable image data to be warped to accommodate a corrective lens prescription for an observer so that the display can be seen without corrective lenses. In another embodiment, the processor 415 receives instructions and/or data and is configured to generate image data for display. For example, the processor 415 may receive 3D geometric primitive data to be rendered based on the instructions to generate the image data in the memory 435. The image data may then be transmitted to the projector 225, 275, 325, or 375, which modulates a light source to project light to the DHOE 220, 270, or 370 or the light guide 320 or 380.

It will be appreciated that the projection engine 410 described and shown in FIG. 4E is only one such example of the projection engine 410. Other embodiments of the projection engine 410 are contemplated as being within the scope of the present disclosure, including but not limited to different light modulating technology such as laser projection; an application specific integrated circuit (ASIC) that includes the processor 415, memory 435, PMIC 425, and/or interface 455 on a single die; and a more complex system with multiple processors (e.g., CPU and GPU) as well as other components in addition to or in lieu of the components shown in FIG. 4E.

Figure 5A:
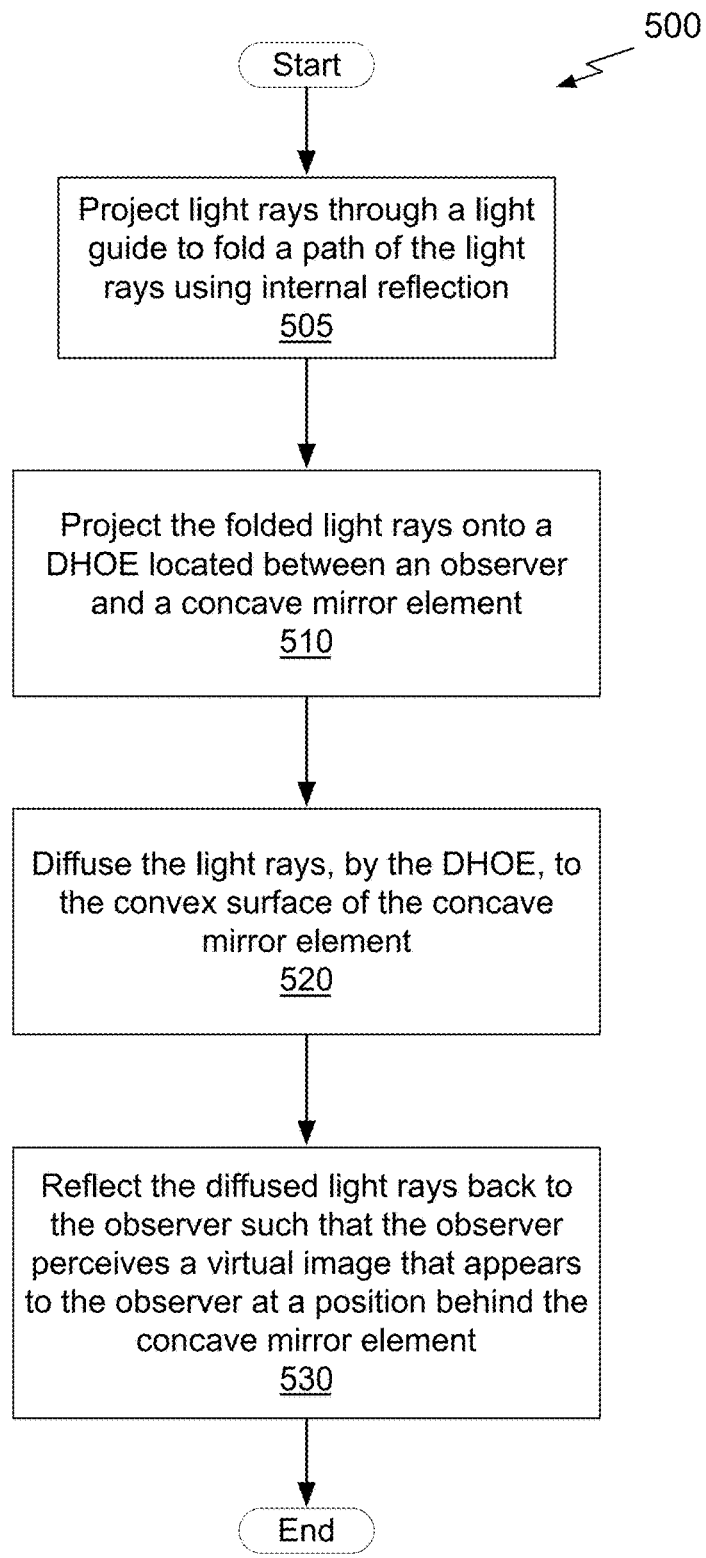
FIG. 5A illustrates a flowchart of another method for displaying virtual/augmented reality content, in accordance with one embodiment.

FIG. 5A illustrates a flowchart of another method 500 for displaying virtual/augmented reality content, in accordance with one embodiment. Persons of ordinary skill in the art will understand that any system that performs method 500 is within the scope and spirit of embodiments of the present invention.

At step 505, light rays are projected by the projector 325 through the light guide 320 to fold a path of the light rays using internal reflection. At step 510, the folded light rays are projected onto the DHOE 220 that is located between the observer 230 and the concave mirror element 210. At step 520, the DHOE 220 diffuses the light rays to the concave surface of the concave mirror element 210. In one embodiment, the concave mirror element 210 is a half-mirror. In one embodiment, the concave mirror element is a full mirror. In one embodiment, the concave mirror element 210 is a wavelength-selective half or full mirror, such as the dichroic concave mirror 310 and the projector 225 is replaced with a projector, such as projector 325.

At step 530, the diffused light rays are reflected back to the observer 230 such that the observer perceives a virtual image that appears to the observer 230 at a position behind the concave mirror element 210 and further from the observer than the concave mirror element 210. In one embodiment, the DHOE 220 is replaced with the DHOE 370, the light guide 320 is replaced with the light guide 380, and the projector 325 is replaced with the projector 375.

Figure 5B:
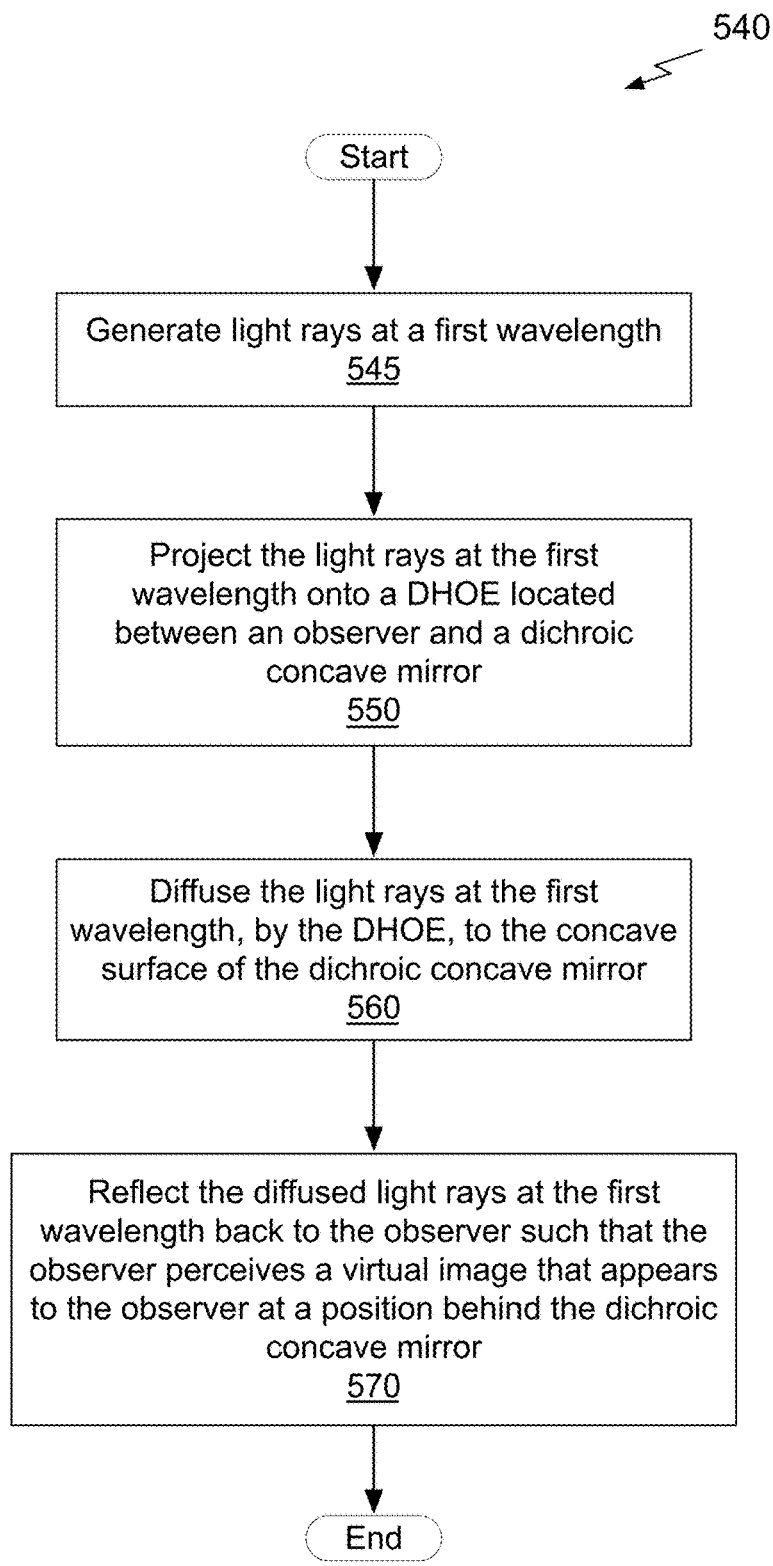
FIG. 5B illustrates a flowchart of yet another method for displaying virtual/augmented reality content, in accordance with one embodiment.

FIG. 5B illustrates a flowchart of yet another method 540 for displaying virtual/augmented reality content, in accordance with one embodiment. Persons of ordinary skill in the art will understand that any system that performs method 540 is within the scope and spirit of embodiments of the present invention.

At step 545, light rays are generated at a first wavelength. At step 550, the light rays at the first wavelength are projected by the projector 325 through the light guide 320 to fold a path of the light rays using internal reflection. At step 560, the DHOE 270 diffuses the light rays at the first wavelength to the concave surface of the dichroic concave mirror 310. In one embodiment, the DHOE 270 does not diffuse light rays that are not at the first wavelength to the concave surface of the dichroic concave mirror 310. At step 570, the diffused light rays are reflected back to the observer 230 such that the observer perceives a virtual image that appears to the observer 230 at a position behind the dichroic concave mirror 310 and further from the observer than the dichroic concave mirror 310. In one embodiment, the dichroic concave mirror 310 is configured to reflect only light rays of the first wavelength. In one embodiment, light rays at least one additional wavelength are projected by the projector 325 through the light guide 320 and the DHOE 270 diffuses the light rays at the at least one additional wavelength and does not diffuse light rays that are not at the at least on additional wavelength. In one embodiment, the DHOE 270 is replaced with the DHOE 370, the light guide 320 is replaced with the light guide 380, and the projector 325 is replaced with the projector 375.

The virtual/augmented reality display systems 200, 300, 350, 400, and 440 each produce high resolution images and a large eye-box is provided without gaze or pupil tracking. Therefore, the observer 230 can view a clear two-dimensional image, even during saccade or eye judder. Using the concave mirror element 210 instead of a lens enables the virtual/augmented reality display systems 200, 300, 350, 400, and 440 to be free from chromatic aberrations and lens distortion and reduces spherical aberration. The virtual/augmented reality display systems 200, 300, 350, and 440 may be implemented as a wearable device, as shown in FIGS. 4A and 4B to provide a virtual reality experience (when the concave mirror elements 210 are full mirrors) or to provide an augmented reality experience with high transparency (when the concave mirror elements 210 are half mirrors or wavelength-selective mirrors).

Exemplary System

Figure 6:
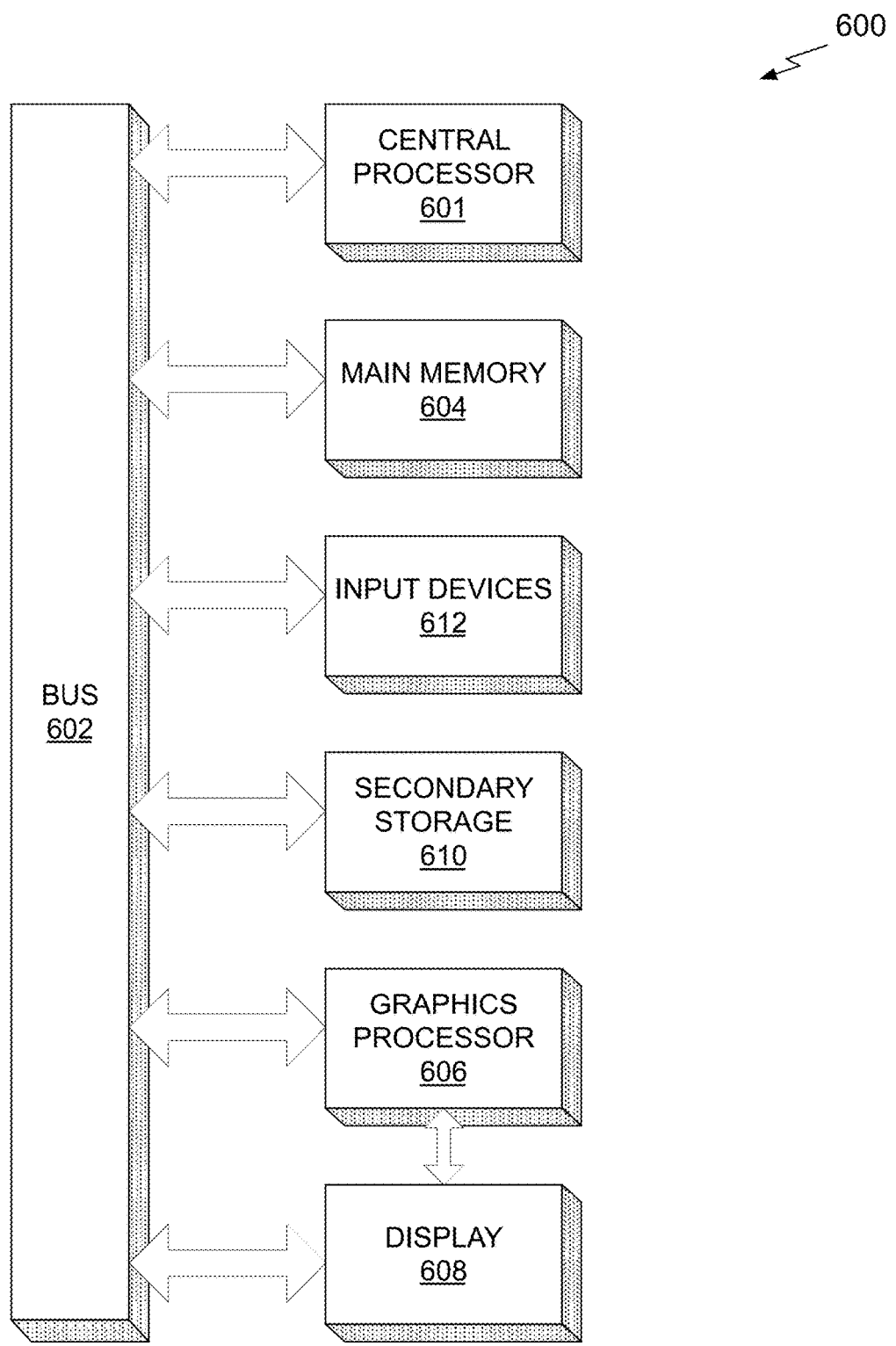
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement a virtual/augmented reality display system 250. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. In one embodiment, the display 608 is a display including at least the DHOE 220 and the concave minor element 210, the DHOE 220 and the index matched concave minor element 310, or the DHOE 220 and the 3-color dichroic concave minor element 310. In one embodiment, the display 608 is implemented in a head-mounted display form factor. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, head-mounted display system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
    a concave mirror element, wherein a concave surface of the concave mirror element faces an observer;
    a diffuser holographic optical element (DHOE) located between the observer and the concave mirror element at a distance from the concave mirror that is less than a focal length of the concave mirror; and
    a projector configured to project light rays onto the DHOE, wherein the light rays are diffused by the DHOE towards the concave surface of the concave mirror element and reflected back, passing through the DHOE to the observer, such that the observer perceives a virtual image that appears to the observer at a position behind the concave mirror element and further from the observer than the concave mirror element.

2. The system of claim 1, further comprising a light guide between the projector and the DHOE and configured to fold a path of the light rays using internal reflection.

3. The system of claim 2, wherein the light guide comprises a wedge-shaped waveguide.

4. The system of claim 1, wherein the projector faces the concave surface of the concave mirror element.

5. The system of claim 1, wherein the projector is located between the DHOE and the concave mirror element and faces away from the concave surface of the concave mirror element.

6. The system of claim 1, wherein the concave mirror element comprises a concave half-mirror configured to allow the observer to see through the concave mirror element.

7. The system of claim 1, wherein the concave mirror element comprises a concave mirror configured to block a scene behind the concave mirror element from the observer.

8. The system of claim 1, wherein the concave mirror element comprises a wavelength-selective dichroic mirror configured to selectively reflect a first wavelength and not reflect a second wavelength.

9. The system of claim 8, wherein the projector is configured to produce the light waves having the first wavelength.

10. The system of claim 1, wherein the projector, DHOE, and concave mirror element are configured within an apparatus suitable for wearing over at least one eye of the observer.

11. The system of claim 1, wherein the projector is located at a second position where a reference wave light source was used to record the DHOE.

12. A method, comprising:
    generating an image by a projection engine; and
    projecting light rays defining the image onto a diffuser holographic optical element (DHOE) located between an observer and a concave mirror element at a distance from the concave mirror that is less than a focal length of the concave mirror, wherein
        the light rays are projected onto the DHOE at a reference angle that causes the light rays to be diffused toward a concave surface of the concave mirror element that faces the observer; and
        the diffused light rays are reflected back to the observer off the concave surface of the concave mirror element, passing through the DHOE to the observer, such that the observer perceives a virtual image that appears to the observer at a position behind the concave mirror element and further from the observer than the concave mirror element.

13. The method of claim 12, further comprising folding a path of the light rays by a light guide located between the projector and the DHOE.

14. The method of claim 13, wherein the light guide comprises a wedge-shaped waveguide.

15. The method of claim 12, wherein a projector faces the concave surface of the concave mirror element and projects the light rays towards the concave surface of the concave mirror element.

16. The method of claim 12, wherein a projector is located between the DHOE and the concave mirror element and projects the light rays away from the concave surface of the concave mirror element.

17. The method of claim 12, wherein the concave mirror element comprises a concave half-mirror configured to allow the observer to see through the concave mirror element.

18. The method of claim 12, wherein the concave mirror element comprises a concave mirror configured to block a scene behind the concave mirror element from the observer.

19. The method of claim 12, wherein the concave mirror element comprises a wavelength-selective dichroic mirror configured to selectively reflect a first wavelength and not reflect a second wavelength.

20. The method of claim 19, wherein a projector produces the light waves to have the first wavelength.

* * * * *